Jan. 11, 1966 M. O'BRIEN 3,228,249
TOMATO BIN SAMPLER
Filed Jan. 31, 1962 4 Sheets-Sheet 4
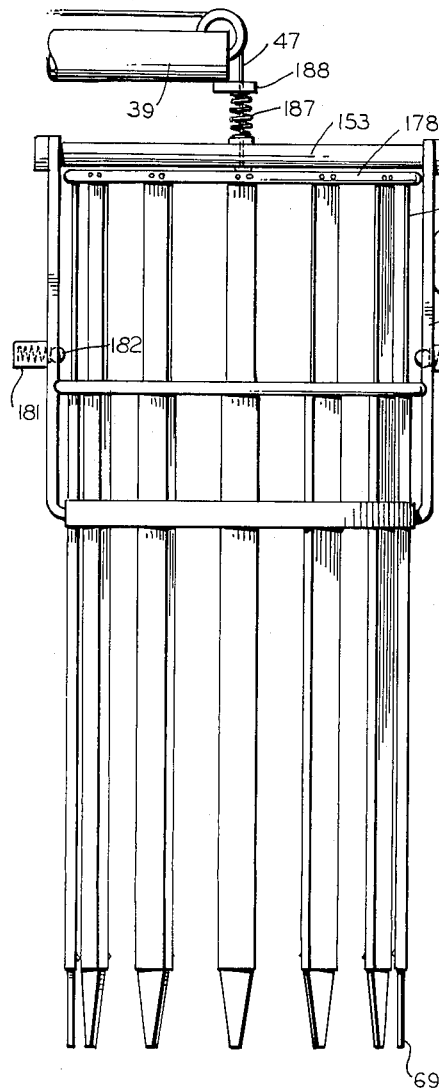
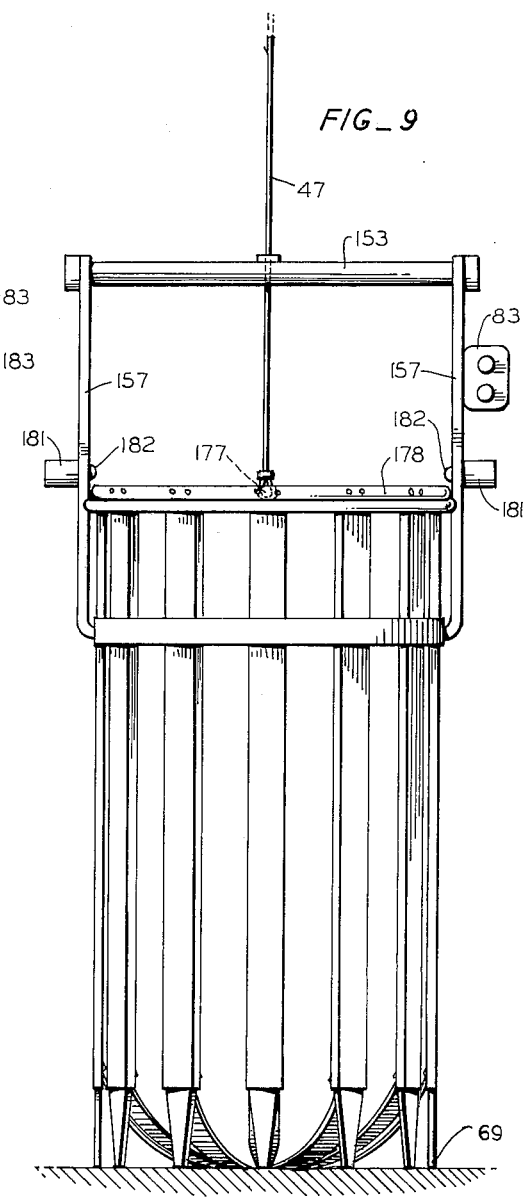
INVENTOR.
MICHAEL O'BRIEN
BY Lothrop & West
ATTORNEYS United States Patent Office 3,228,249
Patented Jan. 11, 1966

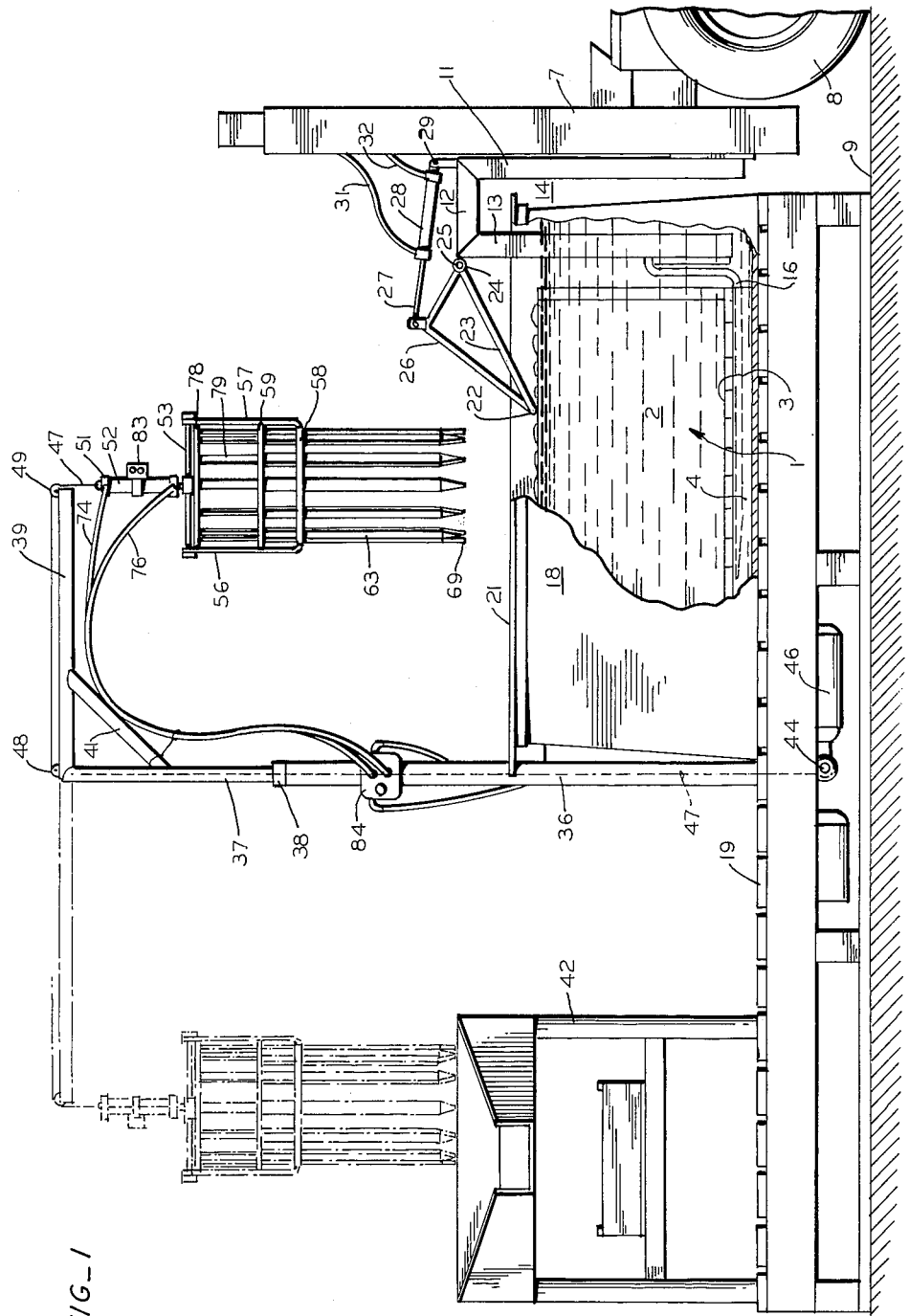

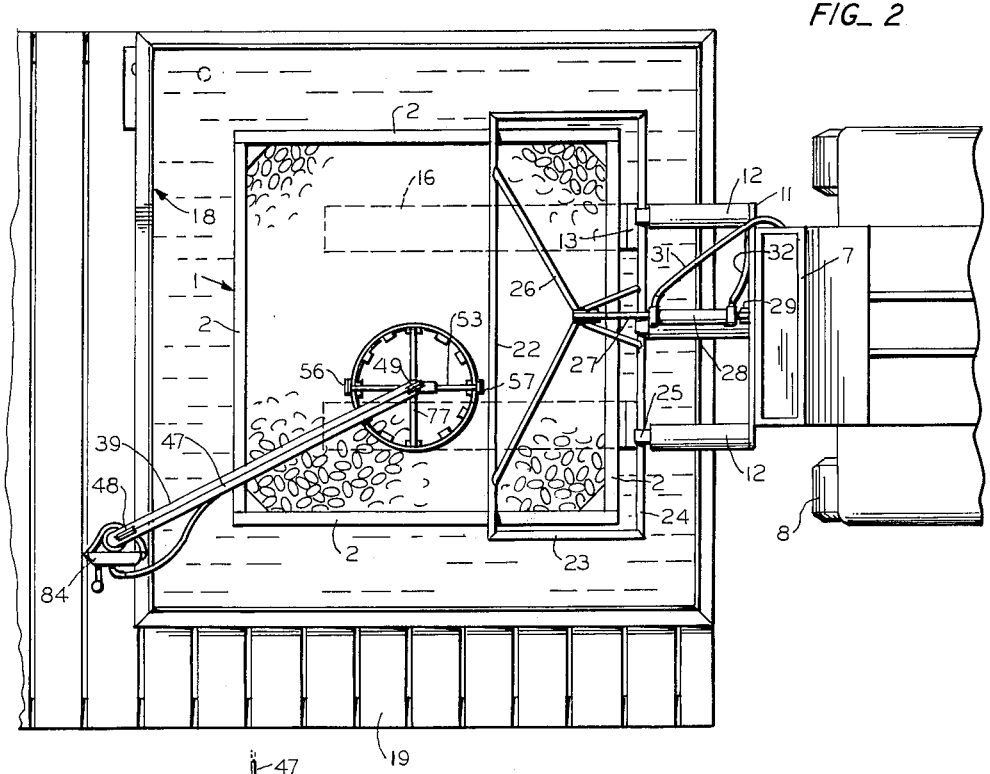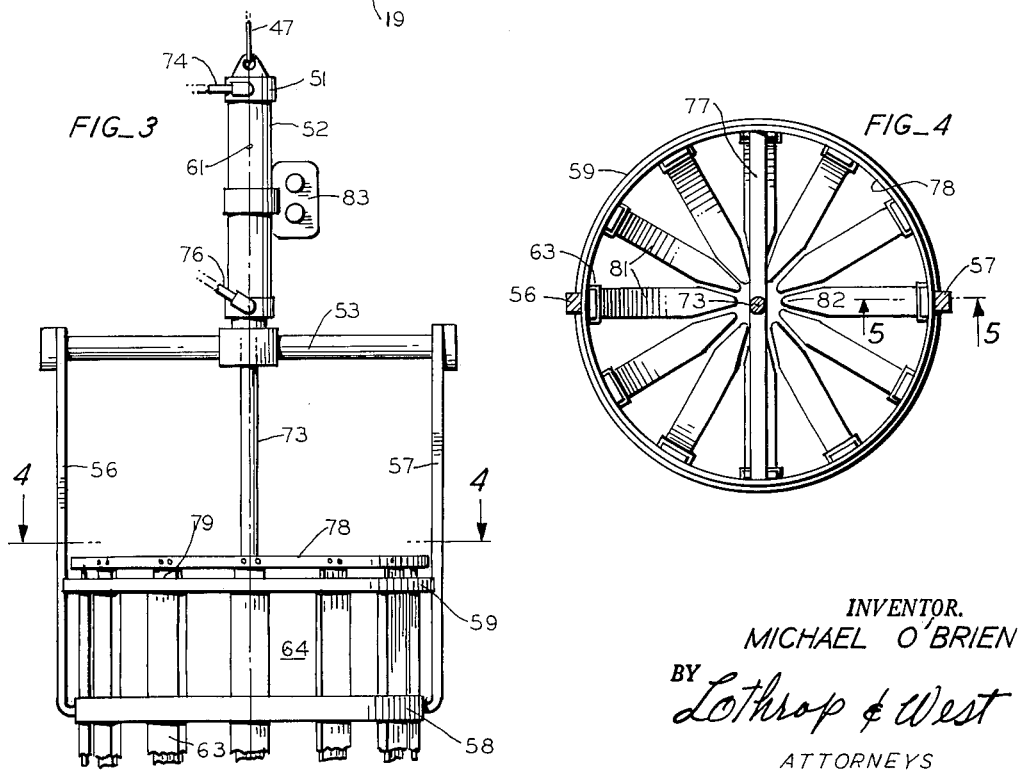

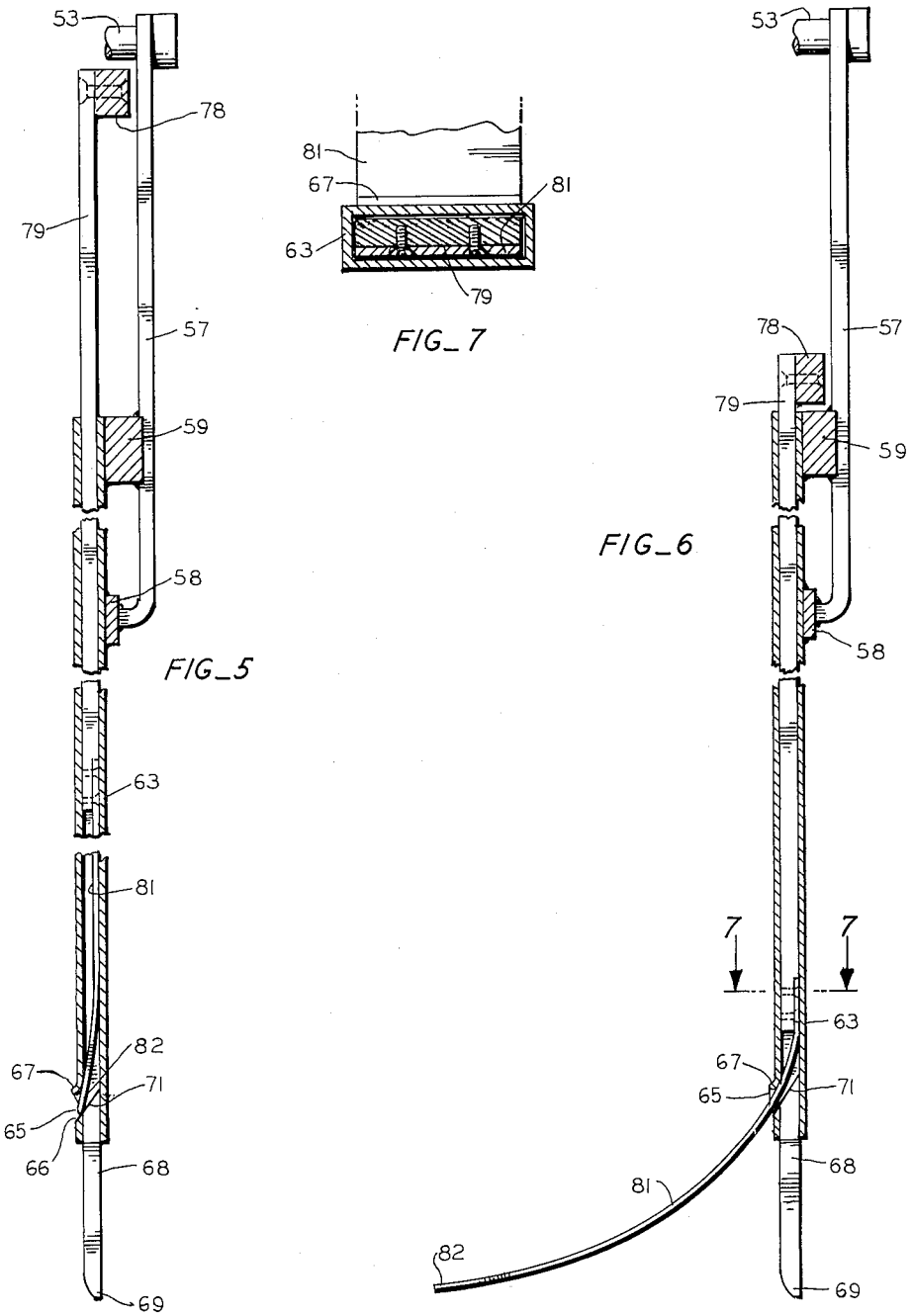

3,228,249
TOMATO BIN SAMPLER
Michael O'Brien, Davis, Calif., assignor to The Regents of the University of California, Berkeley, Calif.
Filed Jan. 31, 1962, Ser. No. 170,118
3 Claims. (Cl. 73—421)

My invention relates to mechanism for taking appropriate and representative samples of fruit such as tomatoes contained in a bulk bin.

With recent changes in agriculture affecting certain crops such as tomatoes, fruit gathered in the field instead of being put into small lug boxes is put into relatively large bins for bulk handling. It is customary to receive and pay for such fruit according to its grade. It becomes necessary, therefore, to have some means of retrieving a representative sample, i.e. an equal amount from each layer of the fruit in the bulk bin, without in any wise interfering with the routine handling of the fruit and particularly without injuring the fruit.

While a number of different fruits can be handled by the present sampler, this arrangement was first worked out in connection with the handling of tomatoes and for convenience is so referred to but only as an example of its use in connection with products of various kinds.

An object of the invention is to provide a means which can operate with tomatoes in a bulk bin for the purpose of retrieving a representaive sample thereof in an accurate, expeditious and noninjurious fashion.

Another object of the invention is to provide a tomato bin sampler sufficiently simple and straightforward to be economical and to be readily usable under field conditions.

Another object of the invention is to provide a tomato bin sampler which can readily be integrated with the type of mechanism already employed in the harvesting of tomatoes.

Another object of the invention is to provide a tomato bin sampler which is rapid enough in its operation so as not to delay the normal harvesting procedure.

A still further object of the invention is to provide a tomato bin sampler which can be employed with only a small amount of personal supervision.

Other objects together with the foregoing are attained in the embodiments of the invention described in the accompanying description and shown in the accompanying drawings in which:

FIGURE 1 is for the most part a side elevation of a tomato bin sampler constructed pursuant to the invention, a portion of the drawing being in cross section on a vertical plane to show the interior arrangement of the tank;

FIGURE 2 is a plan of much of the structure shown in FIGURE 1;

FIGURE 3 is a side elevation of one form of cage and attendant mechanism, various portions of the figure being broken away;

FIGURE 4 is a cross section, the plane of which is indicated by the line 4—4 of FIGURE 3;

FIGURE 5 is a cross sectional view to an enlarged scale, the plane of section being indicated by the line 5—5 of FIGURE 4 and showing the spring leaf in retracted position;

FIGURE 6 is a view similar to FIGURE 5 but showing the parts in a position with the spring leaf projected;

FIGURE 7 is a cross section, the plane of which is indicated by the line 7—7 of FIGURE 6;

FIGURE 8 is a view comparable to FIGURE 3 but showing a modified form of structure and with the spring leaves in retracted position; and FIGURE 9 is a view comparable to FIGURE 8 but showing the parts in position with the spring leaves projected.

While the tomato bin sampler can readily be incorporated in a number of different ways depending upon the particular environment in which it is used and while it can readily be adapted for use with other fruits than tomatoes, it is described as it has been initially embodied for sampling tomatoes in bulk.

Under the present and increasingly used techniques of harvesting, tomatoes are picked in the field and are randomly placed in bulk into a bin 1. This usually is an open top wooden container having four side walls 2 and a bottom 3 reinforced by beams 4. The bin is conveniently made up of slat material having a number of interstices. The picked tomatoes in dry condition are placed in the bin in the field and the bin is then picked up in the field by a specially arranged forklift truck 7.

The truck has driving wheels 8 on the ground 9 and has an elevator 11 thereon which can be lifted and lowered under the control of an operator. The elevator 11 is a framework shaped like an inverted U in side elevation in that it includes upper cross members 12 and spaced forward members 13 to leave an open bottom intervening space 14. At the lower end, the forward members 13 are provided with a plurality of fork tines 16 designed to enter beneath the bottom 3 of the bin 1 between the beams 4 thereof.

In the use of this apparatus the loaded bin 1 resting on the fork tines 16 is brought to a checking station and is elevated sufficiently to be positioned over a water tank 18 resting on a platform 19 supported from the ground 9. The tank 18 is conveniently a rectangular metal container having a reinforcement 21 around its upper edge and is of adequate size readily to receive the bin 1 and the adjacent portions of the inverted U forklift mechanism. The tank is only partially filled with water. When the bin 1 and its lading are lowered into the tank, the water level rises substantially to the top of the tank, at least high enough virtually to include all of the contained fruit.

Because the bin 1 customarily utilized is of wood and may be buoyant, there is mounted on the elevator 11 a transverse hold-down bar 22 having arms 23 connected to a hinge rod 24 secured to the elevator 11 by journal boxes 25. Truss braces 26 on the bar 22 and on the rod 24 join at a clip to which is fastened the rod 27 of a hydraulic or pneumatic jack 28. The jack is connected by a pivot 29 to the elevator 11 and is actuated by means of connecting hoses 31 and 32 extending to a remote point convenient to an operator. When the jack 28 is actuated the hold-down bar 22 is lowered to engage the side walls 2 of the bin 1 and to hold the bin firmly on the fork tines 16 and submerged in the water in the tank 18.

The tomatoes, being held in position in the bin only by gravity, tend to float slightly when they are immersed in the water and move with respect to each other. At least, the tomatoes are readily movable with respect to each other without risk of injury. Advantage is taken of the ready mobility of the fruit in providing the sampling device.

Located on the platform 19 adjacent the tank 18 is a support 36 anchored in place and constituting a hollow column affording a journal support for a tube 37 telescoped therein and held at a desired elevation by means of a thrust collar 38. The tube 37 supports a horizontal boom 39 reinforced by a brace 41. The outboard end of the boom 39 can be rotated into a position above the tank 18 and can be rotated (as shown by the broken lines in FIGURE 1) into another position above an inspection table 42 of the usual sort located on the platform 19.

Disposed beneath the platform 19 is a winch drum 44 suitably driven by an electric motor 46 and having a line 47 extended upwardly through the hollow support 36 and through the tube 37 to a pulley 48. The line extends over the pulley 48 and over another pulley 49 at the outboard end of the boom 39 and depends therefrom to carry the cylinder 51 of a jack 52.

Secured to the cylinder 51 is a cage mechanism including a spider 53 fastened to a pair of depending arms 56 and 57. At their lower ends these arms are inturned to join a bottom frame ring 58 and between their ends the arms are secured to a top frame ring 59. The frame rings 58 and 59 are circular and are concentric with the approximately vertical axis 61 of the jack 52.

Arrayed in a circle around the axis 61 is a plurality of hollow sheaths 63 (FIGURE 5) together constituting a cage of approximately circular cylindrical contour, the various sheaths being parallel to each other and to the axis 61 and being spaced apart to afford interstices 64.

All of the sheaths and their respective mechanisms are substantially the same. Each sheath is conveniently a hollow metal tube substantially an elongated rectangle in cross section, as shown in FIGURE 7. The sheath at the upper end of one of its flat sides is welded to the adjacent top ring 59 and near the top is welded to the bottom ring 58. This leaves most of the length of the sheath depending, the length of the sheath being sufficient to extend from above the water level in the tank 18 to the bottom of the bin 1.

The sheath near the lower end and on the side toward the axis 61 is provided with a lateral opening 65 bounded by an inclined wall 66 and by an out-turned lip 67. In addition, the bottom of the sheath is closed by a plug 68 at its lower end smoothly tapered to end in a foot 69. The top of the plug 68 is contoured to afford a cam surface 71 inclined toward the opening 65. The plug 68 is firmly welded in position.

Included in the jack 52 is a piston rod 73 reciprocable under the control of pneumatic or hydraulic fluid supplied to the jack through lines 74 and 76. The lower end of the piston rod 73 connects to a cross bar 77 and so is joined to an inner ring 78 concentric with the ring 59. The ring 78 carries a number of parallel blocks 79 arranged at spaced intervals and in a circle. Each of the blocks 79 is rectangular in cross section and is slidable within a respective one of the sheaths 63.

The description of one block applies to the others. The lower end of the block is stepped and to the step is secured the upper end of a spring leaf 81. The spring leaf extends downwardly within the sheath and is guided and confined by the sheath walls since the spring leaf when free or unstressed is not straight but has a curvature. The direction of the curvature and its amount are such that the tendency of the lower end 82 of the spring leaf is not only to cam easily against the surface 71 but also to move outwardly through the opening 65 toward the axis 61. The progressively exposed portion of the spring leaf assumes its unstressed curvature as the block 79 is lowered within the sheath. If desired, the block 79 and the spring leaf 81 can be in one piece; that is, the spring leaf 81 can extend to and be directly fastened to the ring 78.

In the operation of this structure, the boom 39 is swung into a position over the tank 18 and over the bin 1 shown in FIGURE 1. The motor 46 is energized by operation of a switch 83 and the line 47 is paid out until the jack 52 and the cage descend. The lower ends of the plugs 68, being tapered, facilitate the entry of the various sheaths between the tomatoes in the bin 1, the water buoying and assisting the tomatoes to move to one side easily and without injury. When sufficient of the line 47 has been paid out, the bottom ends of the plugs 68 rest on the bin bottom 3.

A suitable manual controller 84 on the support 36 is then actuated and the piston rod 73 is forceably projected from the jack 52. The effect of this is to lower the ring 78 with respect to the ring 59 and simultaneously to slide all of the blocks 79 downwardly within the sheaths 63. All of the spring leaves 81 are lowered and are projected through the various openings 65. As successive portions of the spring leaves are released from within the sheaths, they gradually achieve their unstressed condition and take on their natural curvature, substantially as shown in FIGURE 6. The spring leaves shift generally from a vertical position through an arcuate path to locate their extreme ends in a substantially horizontal position. These extreme ends 82 are tapered in plan so that as they approach each other near the center of the cage they form a nearly closed bottom for the cage. Any interstices remaining in the cage are considerably less in extent than the size of the tomatoes being sampled.

After the spring leaves have been projected as described, the motor 46 is energized in the reverse direction and the line 47 is taken in. The cage loaded with a representative sample is lifted to its uppermost position, as shown in FIGURE 1, the spring leaves being stiff enough to support the load. The cage is then swung through an arc to a position over the sampling table 42. The control 84 is reversed so that the piston rod 73 is retracted into the cylinder 51. This lifts the ring 78 relative to the ring 59 of the cage and withdraws the spring leaves into the interior of the sheaths. In this fashion the sampling cage is deprived of a bottom and the tomatoes are so discharged onto the sampling table 42 for further handling.

Following the taking of a sample, the forklift 7 is actuated to lift the bin 1 out of the tank 18 and the bin of sampled tomatoes is taken away for further handling and a subsequent bin of tomatoes to be sampled is brought into position. The sampling cycle is repeated.

In a modified form of the device, the remaining structure is as before except that the jack mechanism 52 is dispensed with. In this instance the line 47 passes through a spider 153 and is directly connected to a cross bar 177 fastened to the upper ring 78 joined to the various blocks 79 of the cage. When the line 47 is paid out, the weight of the structure is sufficient to cause the entire cage to descend through the tomatoes until such time as the bottoms 69 of the plugs rest on the bottom 3 of the bin 1. The cage itself cannot lower any more, but as the line 47 continues to be paid out the weight of the ring 78 and of the blocks 79 and of the attached spring leaves causes the blocks and spring leaves to slide down relative to the sheaths. The spring leaves project just as before to form a cage bottom for the sampled tomatoes.

As the ring 78 descends to its lowermost position by gravity, it rides over detents 181 located in the depending arms 157 of the frame. These detents include balls 182 pressed by springs 183 and are of sufficient effect so that when tension is again placed on the line 47 to lift the cage the ring 78 does not rise above the detents 181. Rather, the entire cage mechanism rises as a unit approximately in the position shown in FIGURE 9. But when the cage structure has returned nearly to the boom 39, a spring 187 on an abutment 188 on the boom 39 touches the spider 153 affording sufficient resistance so that final taking in of the line 47 restores the parts to their original condition suitable for repeated use.

What is claimed is:

1. A tomato bin sampler comprising a frame, a hollow sheath on said frame, said sheath having an opening in one side thereof, means in said sheath adjacent said opening plugging the sheath and affording a cam surface directed toward said opening, a block slidably disposed within said sheath, a spring leaf secured to said block, said spring leaf when unstressed being curved in a direction leading from the hollow sheath through said opening, and means engaging said frame and said block for sliding said block within said sheath for moving said spring leaf against said cam surface and through said opening.

2. A tomato bin sampler comprising a circular frame, a plurality of substantially straight sheaths on said frame and arranged around said frame in parallel relationship, said sheaths being hollow and having openings therein on the inside of the circle formed by the sheaths, means extending into and closing said sheaths beyond said openings and projecting below said sheaths to constitute supporting feet, spring leaves slidably disposed within said sheaths and directed toward said openings, said spring leaves when stressed being substantially straight within said sheaths and when unstressed curving toward the inside of said frame, a circular hoop, means for securing said hoop to said spring leaves, and means engaging said frame and said hoop for sliding said spring leaves in said sheaths.

3. A tomato bin sampler comprising a frame, a substantially straight hollow sheath disposed vertically and at its upper end secured to said frame, a deflector plug having an upper cam surface disposed within the lower end of said hollow sheath forming a closure therefor, said sheath having an opening in the side thereof adjacent said cam surface, a block slidably disposed within said sheath, means connected to said frame and to said block for sliding said block within said sheath, and a flexible spring leaf secured to said block and movable in a straight path within said sheath and in a curved path against said cam surface and through said opening as said block slides within said sheath.

References Cited by the Examiner
UNITED STATES PATENTS

| | | | |
|---|---|---|---|
| 47,929 | 5/1865 | Carr | 294—100 |
| 2,849,139 | 8/1958 | Drain et al. | 214—658 |
| 3,001,656 | 9/1961 | Brooks et al. | 214—309 |
| 3,017,719 | 1/1962 | Sigler | 294—69 XR |
| 3,039,631 | 6/1962 | Baker | 214—313 |
| 3,058,247 | 10/1962 | Puretic | 214—658 |

LOUIS R. PRINCE, *Primary Examiner.*

RICHARD QUEISSER, DAVID SCHONBERG,
*Examiners.*